(12) United States Patent
Sparks

(10) Patent No.: US 8,651,415 B1
(45) Date of Patent: Feb. 18, 2014

(54) ENGINE COWL AND INLET COVER

(75) Inventor: Rick Earl Sparks, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 123 days.

(21) Appl. No.: 13/368,802

(22) Filed: Feb. 8, 2012

(51) Int. Cl.
*B64D 33/02* (2006.01)

(52) U.S. Cl.
USPC ........................................ 244/53 B; 244/121

(58) Field of Classification Search
USPC .................. 244/53 B, 121, 129.4; 60/39.091, 60/39.092; 181/214, 217, 218, 222
See application file for complete search history.

(56) References Cited

U.S. PATENT DOCUMENTS

| | | | | |
|---|---|---|---|---|
| 2,744,382 A | * | 5/1956 | Sokol et al. ................ | 60/39.092 |
| 2,962,184 A | * | 11/1960 | Meier ........................... | 220/232 |
| 3,000,533 A | * | 9/1961 | Jodock .......................... | 220/232 |
| 3,194,525 A | * | 7/1965 | Webb .............................. | 410/46 |
| 3,646,980 A | * | 3/1972 | Peterson .................... | 244/129.4 |
| D232,626 S | * | 9/1974 | Smallwood .................... | D10/60 |
| 4,760,978 A | | 8/1988 | Schuyler et al. | |
| D303,784 S | * | 10/1989 | Micallef ...................... | D12/345 |
| 4,874,145 A | | 10/1989 | Prentice | |
| 5,114,098 A | * | 5/1992 | Campbell .................... | 244/121 |
| 5,660,357 A | | 8/1997 | Grossman et al. | |
| 6,871,819 B2 | * | 3/2005 | Garric .......................... | 244/53 B |
| 7,625,415 B2 | * | 12/2009 | Durocher et al. ............... | 55/306 |

OTHER PUBLICATIONS

"More Random Aviation Photos," Aviation Spectator, 18 pages, accessed Jan. 17, 2012, www.aviationspectator.com/more-aviation-photos?page=9.
"How Can Airplanes Avoid a Bird Strike," Tech Ops Forum, Airliners.net, 9 pages, accessed Jan. 17, 2012, http://www.airliners.net/aviation-forums/tech_ops/read.main/247222/.
Hanssen et al., "A numerical model for bird strike of aluminium foam-based sandwich panels," International Journal of Impact Engineering, vol. 32, Iss. 7, Jul. 2006, pp. 1127-1124.

* cited by examiner

*Primary Examiner* — Philip J Bonzell
(74) *Attorney, Agent, or Firm* — Yee & Associates, P.C.

(57) ABSTRACT

A method and apparatus for covering an end of a housing for an engine. In one embodiment, an apparatus comprises a structure, a flange, and a retaining feature. The structure is configured to cover an opening of a housing for an engine. The flange is comprised of a deformable material and is configured to extend from the structure around a circumference of the structure. The retaining feature is configured to extend from a middle portion of the structure such that the retaining feature and the flange form a channel configured to receive an end of the housing. The retaining feature is configured to extend into an inlet of the engine through the opening of the housing to form an interference fit with a portion of an interior surface of the housing.

20 Claims, 10 Drawing Sheets

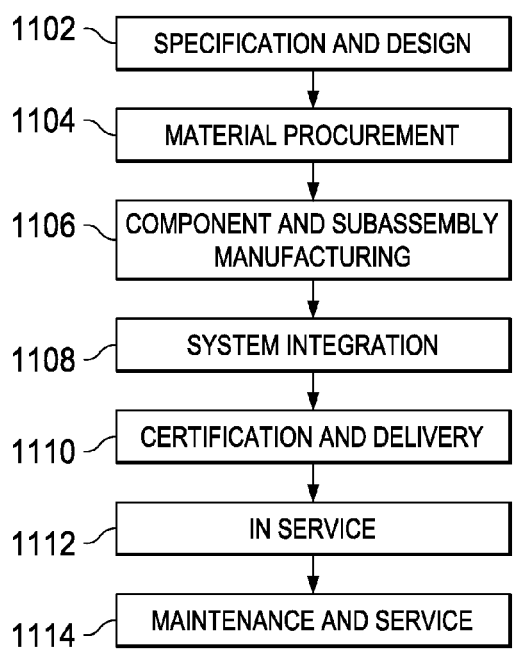
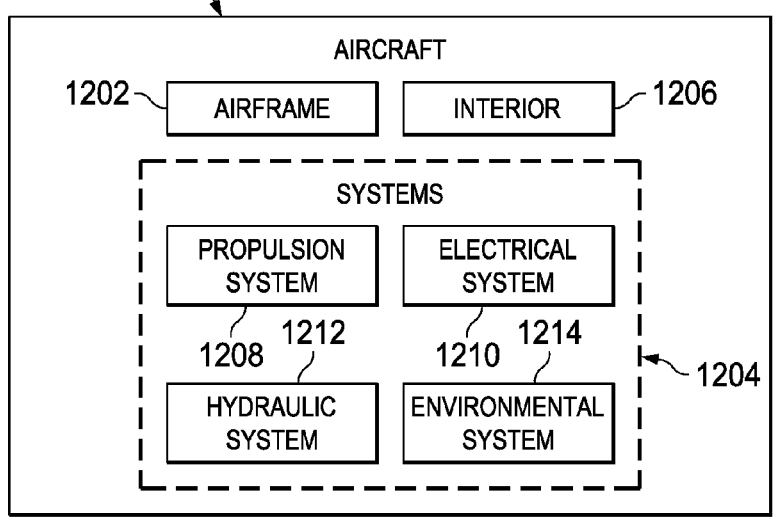

ENGINE COWL AND INLET COVER

BACKGROUND INFORMATION

1. Field

The present disclosure relates generally to aircraft engines and, in particular, to a method and apparatus for protecting the leading edge of a cowl structure and inlet for an aircraft engine.

2. Background

Some currently available aircraft have two or more jet engines mounted to the wings of the aircraft. Turbofans and turbojets are two different types of jet engines that are currently available. Each of these different types of jet engines comprises a housing with an opening at a forward end of the housing. The forward end of the housing is the end of the housing configured to be closest to the nose of the aircraft. The opening at the forward end of the housing allows air to be drawn into the jet engine through an inlet formed by the interior surface of the housing at the forward end of the housing.

Covering this opening into the inlet of a jet engine on an aircraft may be desirable when the aircraft is not in service. For example, covering this opening may be desirable when the aircraft is being stored in a facility, when maintenance is being performed on other parts of the aircraft, when the aircraft is being inspected, during finishing operations, during painting operations, and/or when other operations are being performed on the aircraft.

Further, covering the opening into the inlet of the jet engine may prevent particles, dust, debris, foliage, foreign objects, sand, and/or other undesired items from entering the inlet of the jet engine. The opening of the jet engine may also be covered to protect the inlet from rain, moisture, snow, and/or other weather conditions.

Wind milling may also be prevented by covering the opening into the inlet of the jet engine. Wind milling is the unintended turning of the fan and/or turbine in a jet engine in an aircraft in response to prevailing winds around the aircraft. When an aircraft is stored for long periods of time without a cover for the opening into the inlet of the jet engine, wind milling may cause undesired wear of the jet engine.

Some currently available solutions for covering the opening into the inlet of a jet engine may be covers that comprise plastic materials, fiberglass, and/or other hard materials. These covers may cover the opening into the inlet but may cause undesired inconsistencies to form at the leading edge of the housing. Further, these covers may be unable to protect the leading edge of the housing from inconsistencies caused by, for example, maintenance equipment coming into contact with the leading edge of the housing. Therefore, it would be desirable to have a method and apparatus that takes into account at least some of the issues discussed above as well as possibly other issues.

SUMMARY

In one illustrative embodiment, an apparatus comprises a structure, a flange, and a retaining feature. The structure is configured to cover an opening of a housing for an engine. The flange is comprised of a deformable material and is configured to extend from the structure around a circumference of the structure. The retaining feature is configured to extend from a middle portion of the structure such that the retaining feature and the flange form a channel configured to receive an end of the housing. The retaining feature is configured to extend into an inlet of the engine through the opening of the housing to form an interference fit with a portion of an interior surface of the housing.

In another illustrative embodiment, a cover for an inlet of a jet engine comprises a structure, a flange, and a retaining feature. The structure is configured to cover an opening into the inlet of the jet engine. The opening is defined by a leading edge of a cowl structure for the jet engine. The structure has an interior side and an exterior side in which the exterior side is substantially planar. The flange is comprised of a deformable material and is configured to extend from the structure around a circumference of the structure at the interior side of the structure. The retaining feature is configured to extend from a middle portion of the structure at the interior side of the structure such that the retaining feature and the flange form a channel configured to receive the leading edge of the cowl structure for the jet engine. The retaining feature is configured to extend into the inlet of the jet engine through the opening defined by the leading edge of the cowl structure to form an interference fit with a portion of an interior surface of the cowl structure for the jet engine.

In yet another illustrative embodiment, a method is provided for covering an end of a housing for an engine. The cover is positioned relative to the end of the housing for the engine. The cover comprises a structure, a flange, and a retaining feature. The structure is configured to cover an opening of the housing at the end of the housing. The flange is comprised of a deformable material and is configured to extend from the structure around a circumference of the structure. The retaining feature is configured to extend from a middle portion of the structure such that the retaining feature and the flange form a channel configured to receive the end of the housing. The cover is moved in a direction towards the end of the housing for the engine such that the retaining feature extends into an inlet of the engine through the opening of the housing to form an interference fit between the retaining feature and a portion of an interior surface of the housing.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 11 is an illustration of an aircraft manufacturing and service method in accordance with an illustrative embodiment; and FIG. 12 is an illustration of an aircraft in which an illustrative embodiment may be implemented.

DETAILED DESCRIPTION

The different illustrative embodiments recognize and take into account different considerations. For example, the different illustrative embodiments recognize and take into account that impact at the forward end of the housing for a jet engine may cause any number of inconsistencies to be formed on the housing. Items, such as, for example, without limitation, maintenance equipment, carts, ladders, rails, racks, and/or other items may impact the forward end of the housing when the jet engine is in storage and/or under maintenance.

One or more of these items impacting the forward end of the housing may cause inconsistencies to be formed at the leading edge of the housing and/or the exterior surface of a cowl structure at the forward end of the housing. These inconsistencies may increase maintenance and/or service costs for the jet engine and/or an aircraft on which the jet engine is mounted more than desired. Consequently, the different illustrative embodiments recognize and take into account that covering the leading edge of the housing for a jet engine on an aircraft in addition to covering the opening into the inlet for the jet engine may be desirable.

The different illustrative embodiments recognize and take into account that some currently available covers for this opening may be unable to cover and/or protect the leading edge of the housing. Further, the different illustrative embodiments also recognize and take into account that some of the currently available covers may be comprised of materials that are hard and may scratch the leading edge of the housing and/or exterior surface of the cowl structure.

Thus, the different illustrative embodiments provide a method and apparatus for protecting an inlet of an aircraft engine and a leading edge of a cowl structure for the aircraft engine. In one illustrative embodiment, an apparatus comprises a structure, a flange, and a retaining feature. The structure is configured to cover an opening of a housing for an engine. The flange is comprised of a deformable material and is configured to extend from the structure around a circumference of the structure. The retaining feature is configured to extend from a middle portion of the structure such that the retaining feature and the flange form a channel configured to receive an end of the housing. The retaining feature is configured to extend into an inlet of the engine through the opening of the housing to form an interference fit with a portion of an interior surface of the housing.

Figure 1:
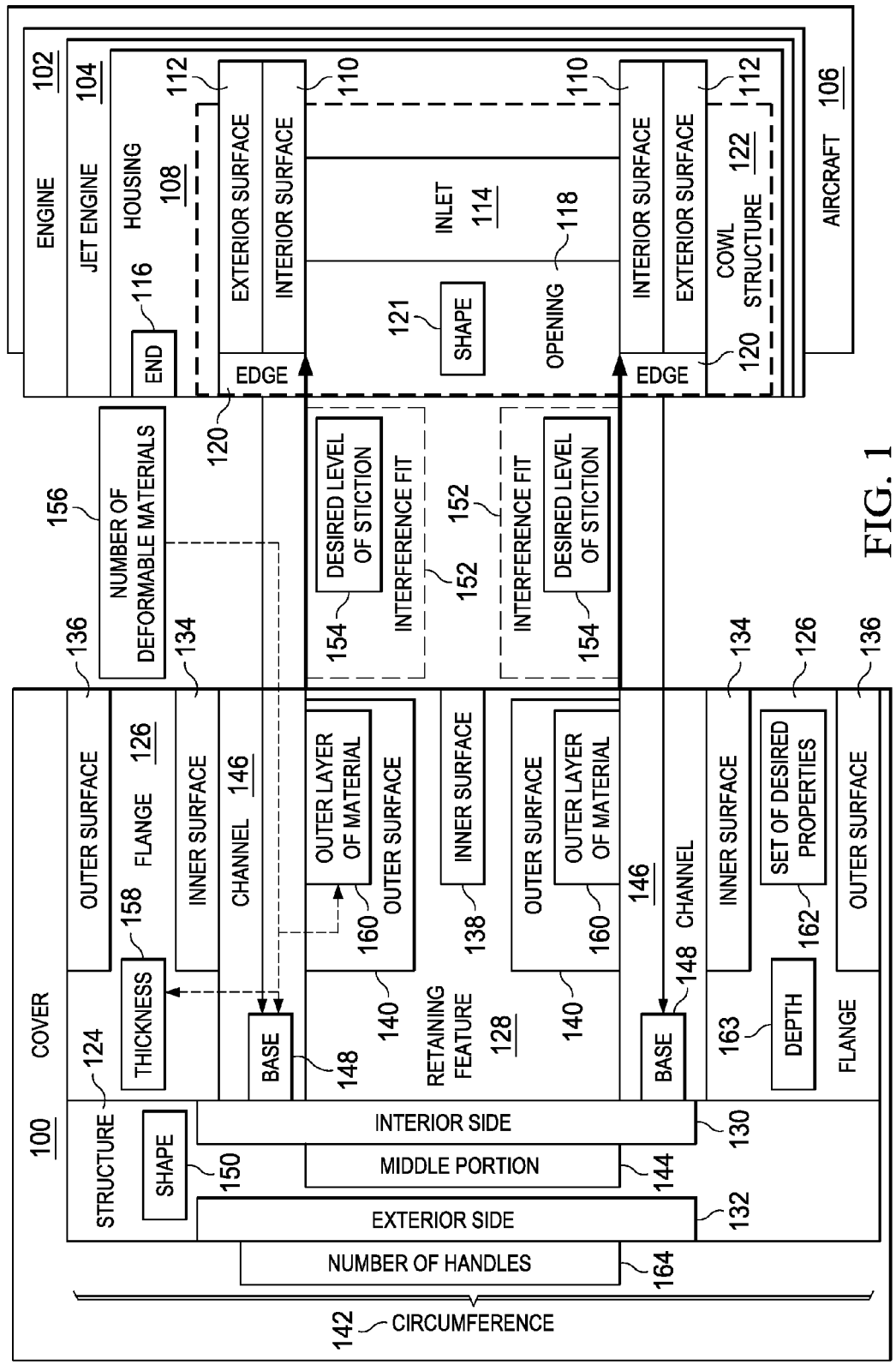
FIG. 1 is an illustration of a cover in the form of a block diagram in accordance with an illustrative embodiment.

With reference now to the figures and, in particular, with reference to FIG. 1, an illustration of a cover in the form of a block diagram is depicted in accordance with an illustrative embodiment. In these illustrative examples, cover 100 may be used as a cover for engine 102.

Engine 102 may take the form of jet engine 104 in these illustrative examples. Jet engine 104 may be, for example, without limitation, a turbofan, a turbojet, a turbine engine, or some other suitable type of engine.

As depicted, jet engine 104 may be mounted to aircraft 106. Aircraft 106 may take the form of, for example, without limitation, an airplane, a jet, an unmanned aerial vehicle, or some other suitable type of aircraft. Of course, in other illustrative examples, jet engine 104 may be for a missile, an automobile, or some other suitable type of vehicle.

As depicted, engine 102 has housing 108. Housing 108 has interior surface 110 and exterior surface 112. A portion of interior surface 110 of housing 108 forms inlet 114 at end 116 of housing 108. End 116 is a forward end of housing 108 in these illustrative examples. In other words, when engine 102 is for aircraft 106, end 116 of housing 108 for engine 102 may be the end closer to the nose of aircraft 106.

Inlet 114 is the space within the hollow portion of housing 108 formed by interior surface 110 through which air may enter into housing 108. In particular, air may enter inlet 114 through opening 118 at end 116 of housing 108. In some cases, inlet 114 may also be referred to as an "air intake".

In these illustrative examples, opening 118 may be defined by edge 120 of housing 108 at end 116. Edge 120 may be referred to as the "leading edge" of housing 108. In particular, edge 120 may be the leading edge for cowl structure 122 of housing 108. Cowl structure 122 may be a particular section of housing 108 located at end 116 of housing 108. Cowl structure 122 may also be referred to as a "cowl" for engine 102.

As depicted, opening 118 may have shape 121. Shape 121 may be any shape formed by a closed curve. In some illustrative examples, shape 121 may be a substantially circular shape. However, in other illustrative examples, the closed curve that forms shape 121 may have one or more portions that are circular, substantially linear, and/or curved in some other manner.

In these illustrative examples, cover 100 may be attached to end 116 of housing 108 to cover opening 118 at end 116 and protect edge 120 of cowl structure 122. As depicted, cover 100 comprises structure 124, flange 126, and retaining feature 128.

Structure 124 has interior side 130 and exterior side 132. Interior side 130 is the side of structure 124 that faces end 116 of housing 108 when cover 100 is attached to end 116 of housing 108. Exterior side 132 is opposite to interior side 130. In these illustrative examples, exterior side 132 of structure 124 is substantially planar. In other words, exterior side 132 is substantially flat.

As depicted, flange 126 has inner surface 134 and outer surface 136. Further, retaining feature 128 has inner surface 138 and outer surface 140. Both flange 126 and retaining feature 128 extend from structure 124 at interior side 130 of structure 124.

In particular, flange 126 extends from structure 124 around circumference 142 of structure 124. Circumference 142 is the outer perimeter of structure 124. In these illustrative examples, flange 126 may extend from structure 124 at an angle perpendicular to interior side 130 of structure 124. However, in other illustrative examples, flange 126 may extend from structure 124 at some other angle with respect to interior side 130 of structure 124. Further, retaining feature 128 extends from middle portion 144 of structure 124.

In these illustrative examples, flange 126 and retaining feature 128 extend from structure 124 in a manner that forms channel 146. Channel 146 is formed by inner surface 134 of flange 126 and outer surface 140 of retaining feature 128. Base 148 of channel 146 is located between inner surface 134 of flange 126 and outer surface 140 of retaining feature 128.

Channel 146 is configured to receive edge 120 of cowl structure 122 when cover 100 is attached to end 116 of housing 108.

Attaching cover 100 to end 116 of housing 108 for engine 102 includes positioning cover 100 relative to end 116. In particular, cover 100 may be positioned relative to end 116 such that interior side 130 of structure 124 with flange 126 and retaining feature 128 face end 116.

Structure 124 has shape 150 selected to fully cover opening 118 of housing 108 when cover 100 is positioned relative to end 116. In one illustrative example, shape 150 may be similar to shape 121 of opening 118 of housing 108. In other words, shape 150 of structure 124 may have dimensions substantially equal to the dimensions for shape 121 of opening 118. In other illustrative examples, shape 150 may be larger than shape 121 of opening 118 to ensure that opening 118 is fully covered.

Attaching cover 100 to end 116 of housing 108 further includes moving cover 100 in a direction towards inlet 114 of housing 108 such that retaining feature 128 extends through opening 118 of housing 108 and into inlet 114. Cover 100 may be moved such that retaining feature 128 extends into inlet 114 to form interference fit 152 with a portion of interior surface 110 of housing 108. In particular, interference fit 152 is formed between a portion of interior surface 110 of housing 108 and a portion of outer surface 140 of retaining feature 128.

As used herein, an "interference fit" between two components, such as interference fit 152 between interior surface 110 of housing 108 and outer surface 140 of retaining feature 128, is a fastening of these two components through friction when these components are pushed together.

For example, when retaining feature 128 is moved into inlet 114, outer surface 140 of retaining feature 128 is pushed against interior surface 110 of housing 108. This contact between outer surface 140 of retaining feature 128 and interior surface 110 of housing 108 creates friction. The friction created increases as retaining feature 128 is moved further into inlet 114 until interference fit 152 is formed.

In these illustrative examples, interference fit 152 provides desired level of stiction 154 between interior surface 110 of housing 108 and outer surface 140 of retaining feature 128. "Stiction", as used herein, may be the static friction that needs to be overcome to enable relative motion of stationary objects in contact.

In this manner, desired level of stiction 154 may be a desired level of static friction that needs to be overcome to enable relative motion between cover 100 and end 116 of housing 108. Cover 100 may be considered to be attached to end 116 of housing 108 when interference fit 152 has been formed with desired level of stiction 154.

In these illustrative examples, channel 146 is configured to receive edge 120 of cowl structure 122 when retaining feature 128 is moved into inlet 114. In some cases, edge 120 may come into contact with base 148 of channel 146 when retaining feature 128 is moved into inlet 114 and/or interference fit 152 is formed.

Further, in some illustrative examples, a portion of exterior surface 112 of housing 108 at end 116 may come into contact with inner surface 134 of flange 126 when retaining feature 128 is moved into inlet 114 and/or interference fit 152 is formed. Of course, in other illustrative examples, edge 120 and/or exterior surface 112 of housing 108 may not come into contact with base 148 of channel 146 and/or inner surface 134 of flange 126 when interference fit 152 is being formed. In particular, contact between interior surface 110 of housing 108 and outer surface 140 of retaining feature 128 may be the only contact formed between engine 102 and cover 100 in some illustrative examples.

Flange 126, retaining feature 128, and base 148 of channel 146 may be comprised of any number of materials. These materials may be selected to reduce a possibility of a number of inconsistencies being formed at edge 120 of cowl structure 122, on exterior surface 112 of cowl structure 122, and/or on interior surface 110 of cowl structure 122 when retaining feature 128 is moved into inlet 114 and interference fit 152 is being formed. As used herein, a "number of", when used with reference to items, means one or more items. For example, a number of inconsistencies means one or more inconsistencies.

Further, flange 126 may be comprised of a deformable material selected from at least one of number of deformable materials 156. A deformable material in number of deformable materials 156 may be any material configured to be flexible and/or capable of being shaped. Further, a deformable material in number of deformable materials 156 may be a material that does not cause inconsistencies outside of selected tolerances to form on a surface when the surface is in contact with the material.

Number of deformable materials 156 may include at least one of, for example, without limitation, a foam material, a polyurethane material, an elastomer, a polymer, a shape memory polymer, a syntactic foam material, an integral skin foam material, an aerogel, and some other suitable types of deformable material. In one illustrative example, flange 126 may be comprised of a foam material selected from number of deformable materials 156.

Depending on the implementation, this foam material may comprise at least one of an open-cell foam material, a closed-cell foam material, a shape memory polymer, a composite material, and some other suitable type of material. Of course, in other illustrative examples, flange 126 may be comprised of one or more other deformable materials selected from number of deformable materials 156 in addition to and/or in place of a foam material.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Further, one or more deformable materials selected from number of deformable materials 156 may be added to base 148 of channel 146. In this manner, a possibility of inconsistencies being formed at edge 120 of cowl structure 122 when edge 120 comes into contact with base 148 may be reduced.

In these illustrative examples, retaining feature 128 may be comprised of various materials. Retaining feature 128 may be comprised of any number of materials configured to give retaining feature 128 a selected level of rigidity. In this manner, retaining feature 128 may not change shape or bend outside of selected tolerances when retaining feature 128 is moved into inlet 114 to form interference fit 152.

Retaining feature 128 may be comprised of, for example, without limitation, at least one of a rubber material, a silicone material, an elastomer, a foam material, a rubberized foam material, a honeycomb material, and other suitable types of materials. Additionally, in some illustrative examples, at least a portion of outer surface 140 of retaining feature 128 may be formed by outer layer of material 160. Outer layer of material 160 may form at least the portion of outer surface 140 of retaining feature 128 that forms interference fit 152 with interior surface 110 of housing 108.

Outer layer of material 160 may be selected to reduce a possibility of inconsistencies being formed on interior surface 110 of housing 108 when retaining feature 128 is moved into inlet 114 to form interference fit 152. In one illustrative example, outer layer of material 160 may comprise one or more deformable materials selected from number of deformable materials 156. Outer layer of material 160 of retaining feature 128 may have a smaller thickness than thickness 158 of flange 126 in some cases.

In these illustrative examples, the one or more deformable materials selected from number of deformable materials 156 for flange 126 and thickness 158 for flange 126 may be selected such that flange 126 has set of desired properties 162. Set of desired properties 162 may include at least one of a desired level of thermal resistance, a desired flexibility, a desired weight, a capability of absorbing kinetic energy, a capability of being easily cleaned, and other suitable properties.

As one illustrative example, thickness 158 for flange 126 may be selected to reduce a possibility of one or more inconsistencies being formed on exterior surface 112 of housing 108 when kinetic energy is applied to flange 126. Kinetic energy may be applied to flange 126 when, for example, an object impacts flange 126. Thickness 158 may be selected such that at least a portion of the kinetic energy applied to flange 126 is absorbed. Further, the deformable material selected for flange 126 may be configured to absorb the kinetic energy applied to flange 126.

Additionally, depth 163 for flange 126 may be selected such that flange 126 extends over a portion of exterior surface 112 of housing 108 by a desired amount when cover 100 is attached to end 116 of housing 108. Flange 126 may cover and protect this portion of exterior surface 112 from, for example, without limitation, impact by a foreign object.

In these depicted examples, structure 124 may be comprised of any number of materials configured to give structure 124 a selected level of rigidity and strength. For example, without limitation, structure 124 may be comprised of at least one of wood, plastic, metal, a metal alloy, a composite material, fiberglass, a resin-filled fiber, a honeycomb sandwich panel, a metal honeycomb and resin-reinforced fiber panel, and other suitable types of materials.

In these illustrative examples, cover 100 may have number of handles 164 attached to exterior side 132 of structure 124. Number of handles 164 may be used to attach cover 100 to end 116 of housing 108, remove cover 100 from end 116 of housing 108, transport cover 100, store cover 100, position cover 100, and/or handle cover 100 in some other suitable manner.

Thus, the different illustrative embodiments provide a cover for an inlet of an engine that also protects a leading edge of the housing for the engine. Cover 100 may be used to cover opening 118 into inlet 114 and protect edge 120 of cowl structure 122 in a number of different situations.

These situations may include, for example, without limitation, when engine 102 is in storage, when operations are being performed on engine 102, when engine 102 is being visually inspected, when painting operations are being performed on engine 102, and/or other suitable situations. Further, cover 100 may be attached to end 116 of housing 108 when engine 102 is mounted on aircraft 106 and/or when engine 102 is not mounted on aircraft 106. When engine 102 is mounted on aircraft 106, cover 100 may be used when aircraft 106 is being manufactured, is not in use, is in storage, or is under maintenance.

The illustration of cover 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, cover 100 may include features in addition to structure 124, flange 126, and retaining feature 128. In some illustrative examples, retaining feature 128, flange 126, and/or structure 124 may be coated with a material in addition to the materials for these features described above. The coating may be, for example, without limitation, a silicone coating, a protective coating, a liquid repellant coating, or some other suitable type of coating.

In other illustrative examples, additional layers of material may be placed on cover 100 when using cover 100 during certain operations. For example, without limitation, when cover 100 is used to protect inlet 114 and edge 120 of cowl structure 122 during painting operations, a layer of material may be placed around outer surface 136 of flange 126. Masking tape used during painting operations may be attached to this layer of material instead of outer surface 136 of flange 126 to protect inconsistencies from forming on outer surface 136 of flange 126 as a result of the masking tape.

Referring now to FIGS. 2-9, illustrations of an example of one implementation for a cover for an inlet of an engine are depicted in accordance with an illustrative embodiment. In FIGS. 2-9, cover 200 is an example of one implementation for cover 100 in FIG. 1.

Figure 2:
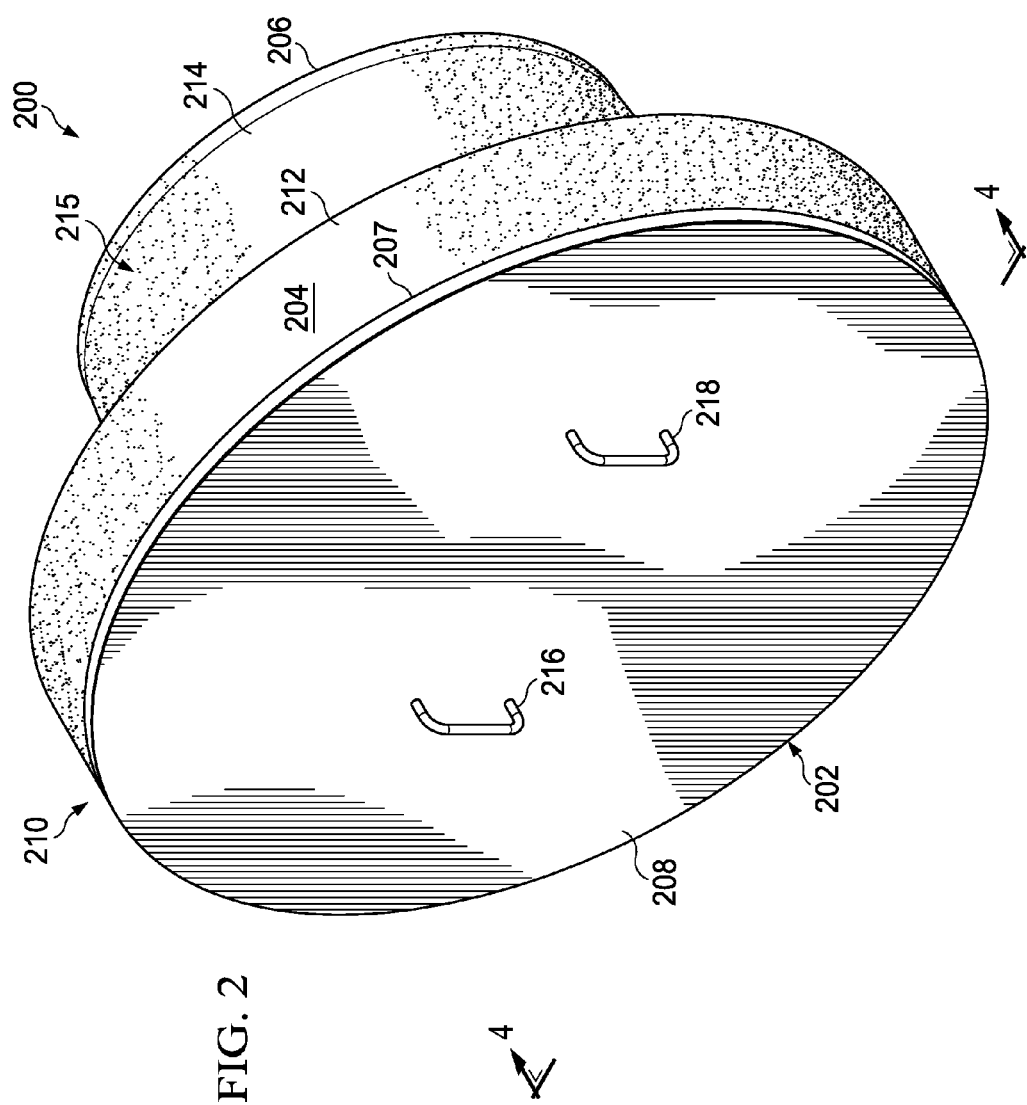
FIG. 2 is an illustration of a perspective view of a cover in accordance with an illustrative embodiment.

With reference now to FIG. 2, an illustration of a perspective view of cover 200 is depicted in accordance with an illustrative embodiment. In this illustrative example, cover 200 comprises structure 202, flange 204, and retaining feature 206. Structure 202, flange 204, and retaining feature 206 are examples of implementations for structure 124, flange 126, and retaining feature 128, respectively, in FIG. 1.

Structure 202 has interior side 207 and exterior side 208. Exterior side 208 of structure 202 is substantially planar in this illustrative example. In other words, exterior side 208 is substantially flat.

In this depicted example, flange 204 extends from structure 202 at interior side 207 of structure 202. In particular, flange 204 extends from structure 202 around circumference 210 of structure 202. Flange 204 has an inner surface (not seen in this view) and outer surface 212. Further, retaining feature 206 extends from a middle portion of structure 202 at interior side 207 of structure 202. Retaining feature 206 has an inner surface (not seen in this view) and outer surface 214. Outer layer of material 215 is present at outer surface 214.

Additionally, as depicted, cover 200 has handle 216 and handle 218. Handle 216 and handle 218 may be used to position cover 200, transport cover 200, move cover 200, attach cover 200 to the end of a housing for an engine, store cover 200, and/or handle cover 200 in some other suitable manner.

Figure 3:
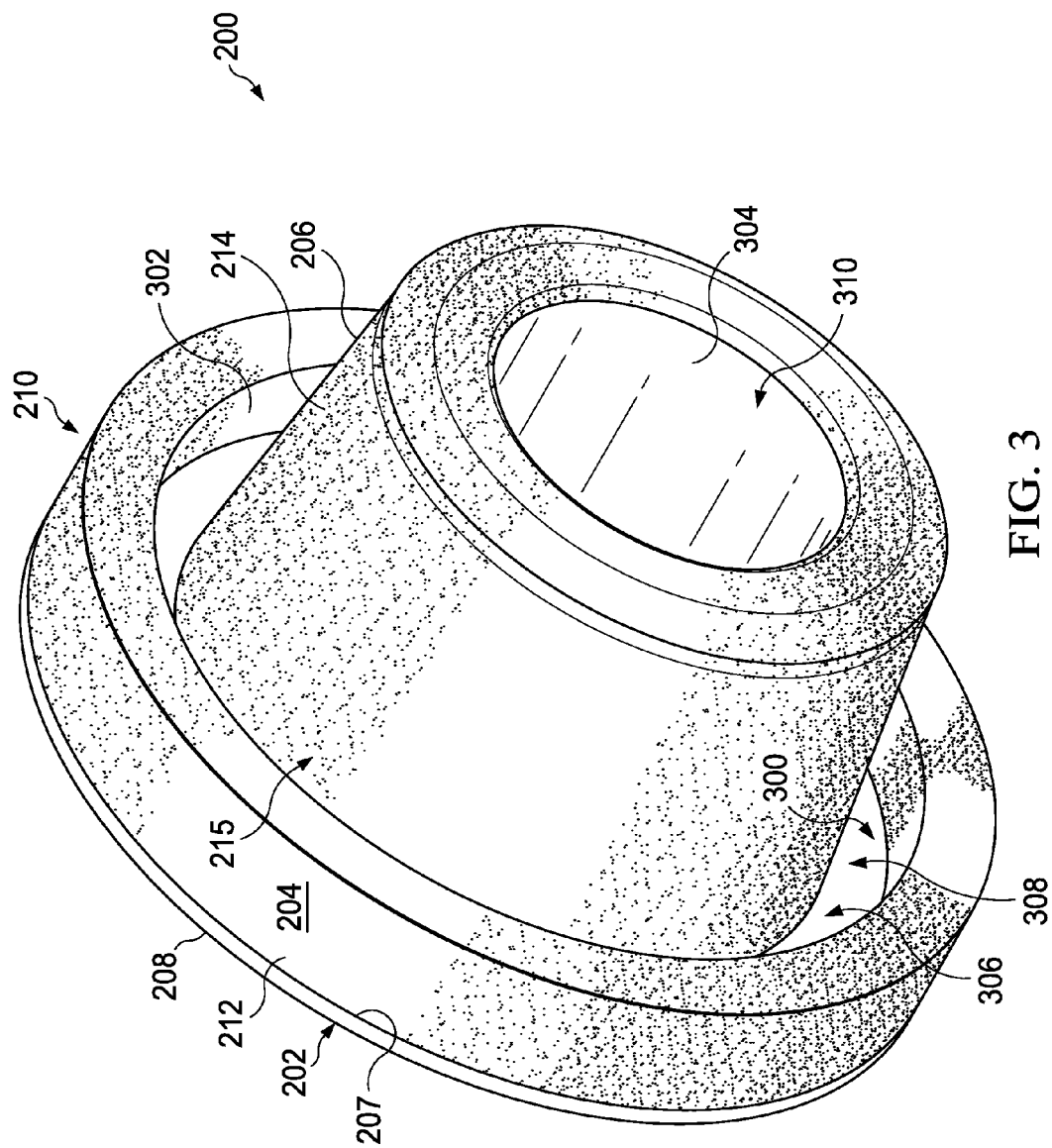
FIG. 3 is an illustration of another perspective view of a cover in accordance with an illustrative embodiment.

With reference now to FIG. 3, an illustration of another perspective view of cover 200 is depicted in accordance with an illustrative embodiment. In this illustrative example, flange 204 and retaining feature 206 are seen extending from interior side 207 of structure 202. Further, inner surface 302 of flange 204 and inner surface 304 of retaining feature 206 are seen.

In this illustrative example, flange 204 and retaining feature 206 extend from structure 202 at interior side 207 of structure 202 in a manner that forms channel 306. Channel 306 may have base 308 located at interior side 207 of structure 202. Channel 306 may be configured to receive a leading edge of a cowl structure for a housing for an engine.

As depicted, inner surface 304 of retaining feature 206 forms hollow portion 310 in retaining feature 206. Hollow portion 310 may be configured to reduce the amount of material needed for retaining feature 206. In this manner, hollow portion 310 may reduce a weight and/or cost for retaining feature 206 as compared to hollow portion 310 being filled.

In this illustrative example, flange 204, retaining feature 206, and base 308 of channel 306 may comprise materials configured to reduce a possibility of inconsistencies being formed at the forward end of the housing for an engine when cover 200 is attached to the forward end of the housing. For example, flange 204 may be comprised of a deformable material, such as, for example, a memory foam material. Further, the memory foam material may also be added to base 308 of channel 306.

As depicted, retaining feature 206 may have outer layer of material 215 at outer surface 214 of retaining feature 206. Outer layer of material 215 may also be comprised of a memory foam material in this depicted example. Other portions of retaining feature 206 may be comprised of a material selected to give retaining feature 206 a selected level of rigidity.

Figure 4:
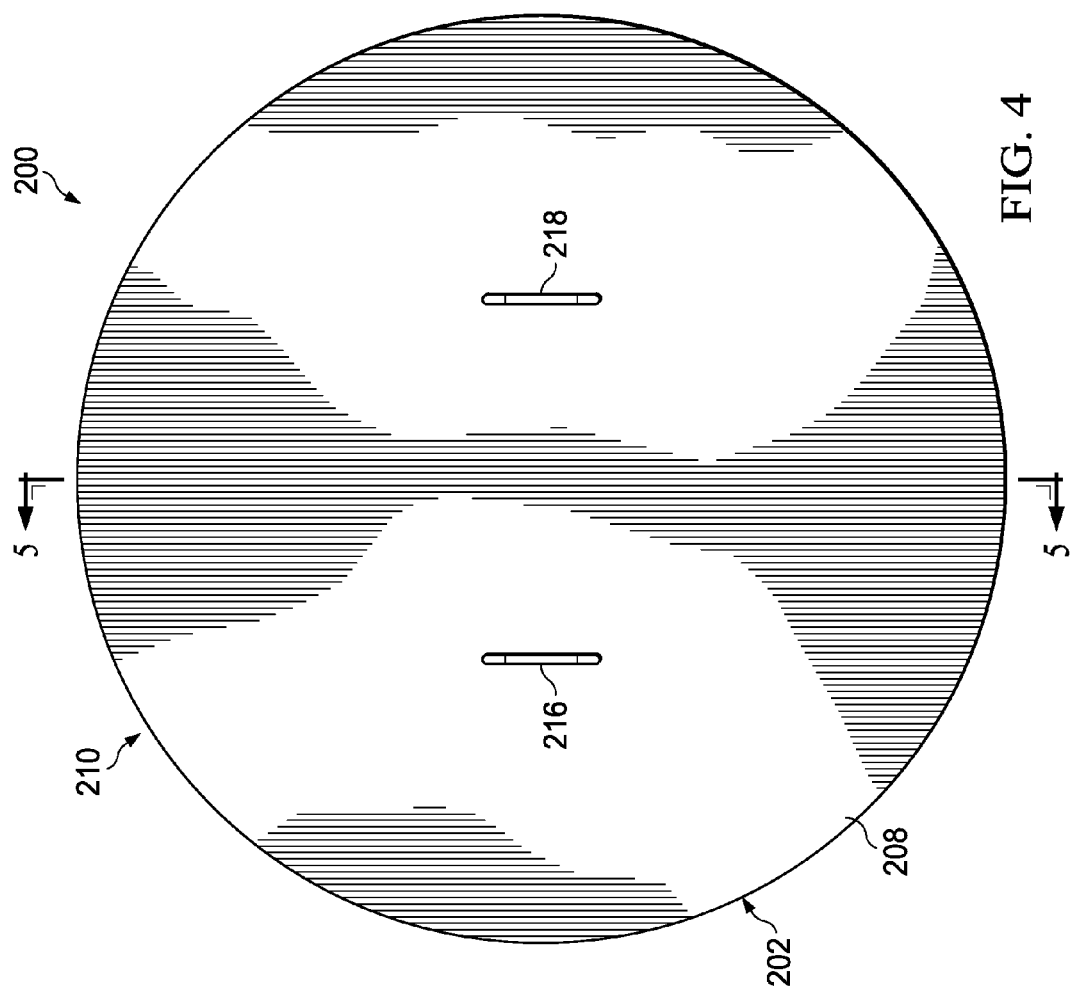
FIG. 4 is an illustration of a top view of a cover in accordance with an illustrative embodiment.

With reference now to FIG. 4, an illustration of a top view of cover 200 is depicted in accordance with an illustrative embodiment. In this illustrative example, a top view of cover 200 taken along lines 4-4 in FIG. 2 is depicted.

Figure 5:
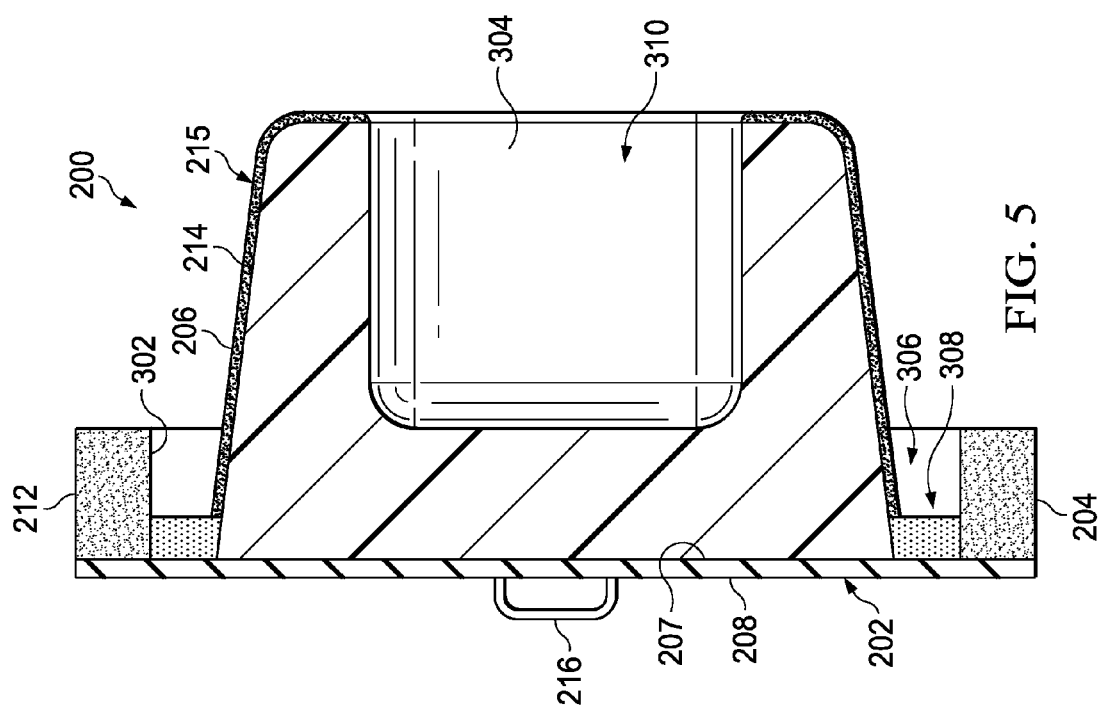
FIG. 5 is an illustration of a cross-sectional view of a cover in accordance with an illustrative embodiment.

Turning now to FIG. 5, an illustration of a cross-sectional view of cover 200 is depicted in accordance with an illustrative embodiment. In this illustrative example, a cross-sectional view of cover 200 taken along lines 5-5 in FIG. 4 is depicted. This cross-sectional view provides a clearer view of channel 306.

Figure 6:
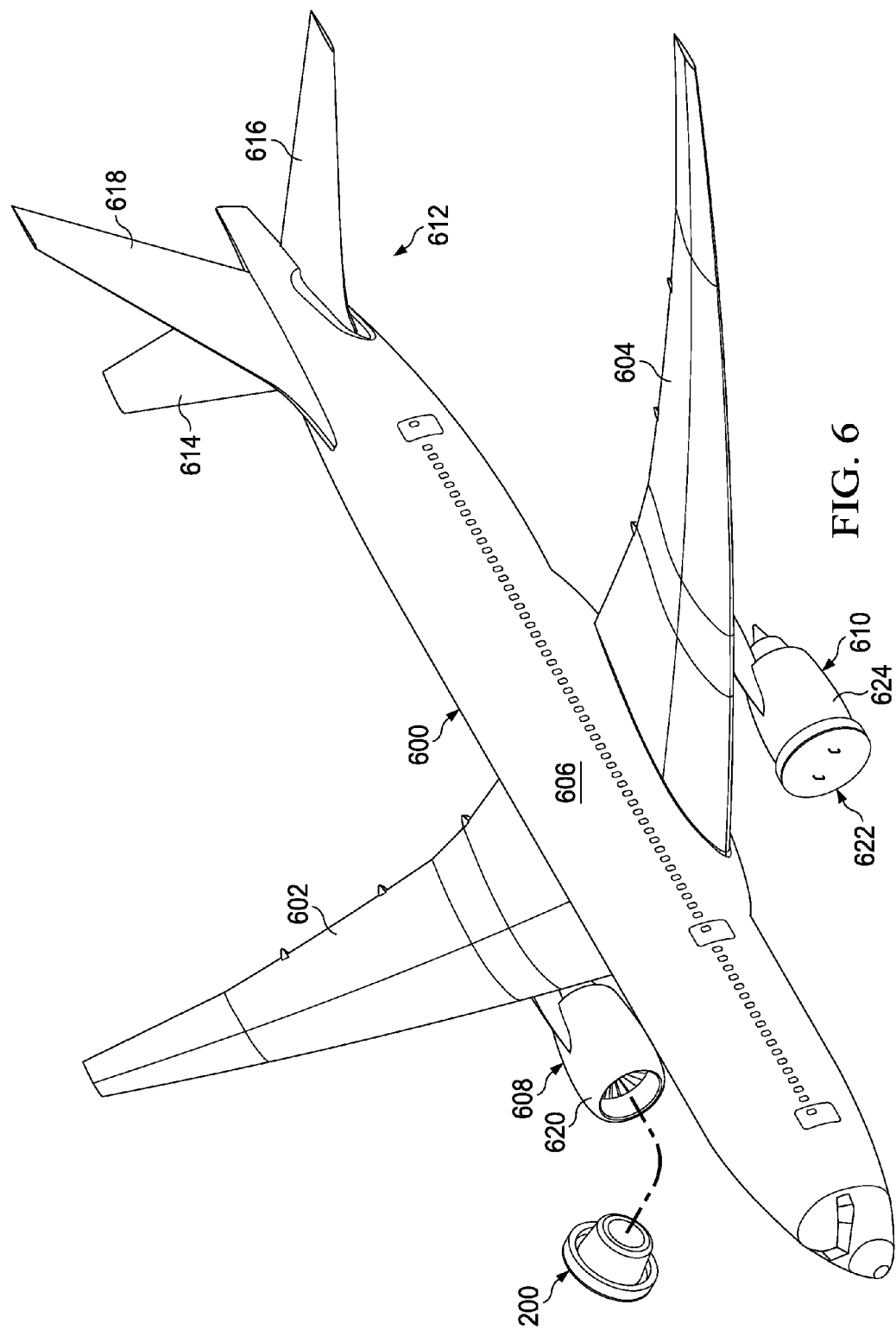
FIG. 6 is an illustration of an aircraft with a cover attached to an engine of the aircraft in accordance with an illustrative embodiment.

With reference now to FIG. 6, an illustration of an aircraft with cover 200 attached to an engine of the aircraft is depicted in accordance with an illustrative embodiment. In this illustrative example, aircraft 600 is an example of one implementation for aircraft 106 in FIG. 1. Aircraft 600 has wing 602 and wing 604 attached to body 606.

Aircraft 600 includes engine 608 attached to wing 602 and engine 610 attached to wing 604. Engine 608 and engine 610 may be examples of one implementation for engine 102 in FIG. 1. Body 606 of aircraft 600 has tail section 612. Horizontal stabilizer 614, horizontal stabilizer 616, and vertical stabilizer 618 are attached to tail section 612 of body 606.

As depicted, cover 200 from FIGS. 2-5 may be positioned relative to housing 620 for engine 608 for attachment to housing 620. In this illustrative example, cover 622 has already been attached to housing 624 for engine 610. Cover 622 may be implemented in a manner similar to cover 200 in FIGS. 2-5.

Figure 7:
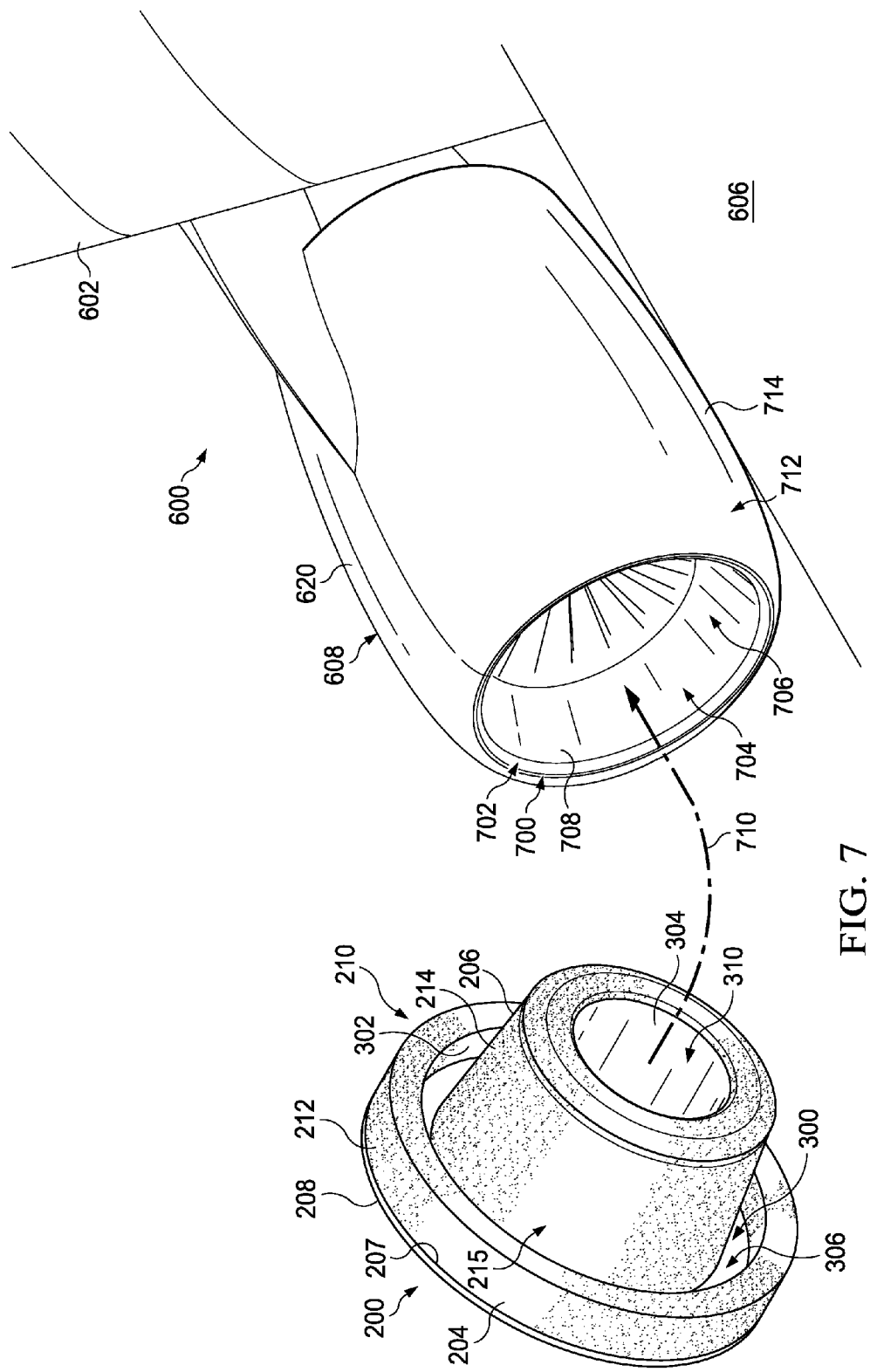
FIG. 7 is an illustration of a cover positioned near an engine in accordance with an illustrative embodiment.

With reference now to FIG. 7, an illustration of cover 200 positioned near engine 608 is depicted in accordance with an illustrative embodiment. As depicted, cover 200 may be configured for attachment to end 700 of housing 620 of engine 608.

Housing 620 has leading edge 702 at end 700 of housing 620. Leading edge 702 defines opening 704. Opening 704 may be an opening into inlet 706 for engine 608. Inlet 706 may be formed by interior surface 708 of housing 620.

In this illustrative example, cover 200 may be moved towards housing 620 in the direction of arrow 710 to attach cover 200 to end 700 of housing 620. When cover 200 is moved towards inlet 706, retaining feature 206 of cover 200 moves through opening 704 and extends into inlet 706. Outer surface 214 of retaining feature 206 may form an interference fit with interior surface 708 of housing 620.

Further, as retaining feature 206 is moved into inlet 706, channel 306 may receive leading edge 702 of housing 620. In this illustrative example, leading edge 702 is the leading edge of cowl structure 712 of housing 620.

When retaining feature 206 has been pushed into inlet 706 far enough in the direction of arrow 710 such that an interference fit is formed, flange 204 may extend over a portion of exterior surface 714 of housing 620 at end 700 of housing 620 to cover this portion of exterior surface 714. In this manner, cover 200 may be attached to end 700 of housing 620 for engine 608 to cover opening 704 into inlet 706 and protect leading edge 702 of cowl structure 712 of housing 620.

Figure 8:
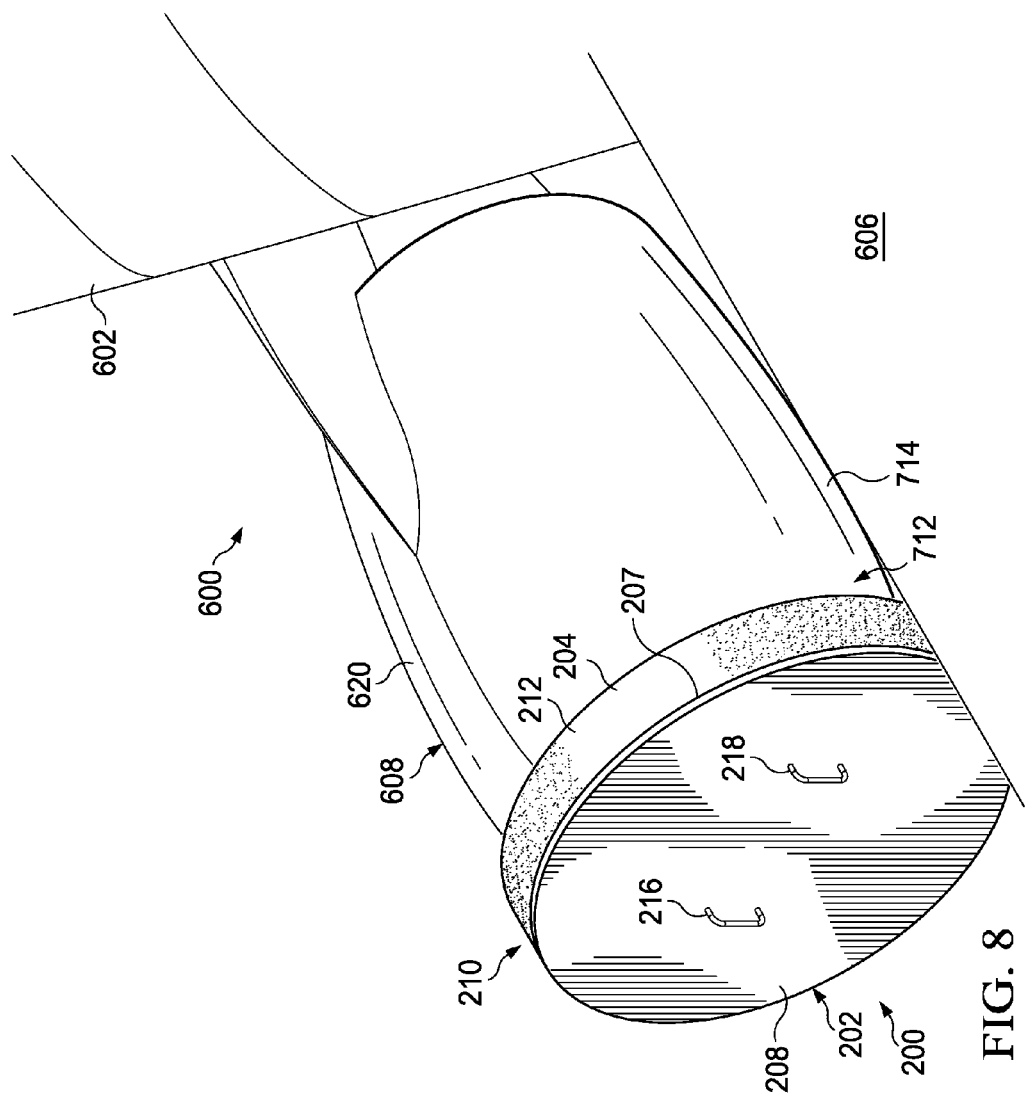
FIG. 8 is an illustration of a cover attached to an engine in accordance with an illustrative embodiment.

Turning now to FIG. 8, an illustration of cover 200 attached to engine 608 is depicted in accordance with an illustrative embodiment. In this illustrative example, cover 200 has been attached to end 700 in FIG. 7 of housing 620. As depicted, opening 704 into inlet 706 of engine 608 in FIG. 7 has been covered by cover 200. Further, leading edge 702 of cowl structure 712 of housing 620 in FIG. 7 has been covered.

Figure 9:
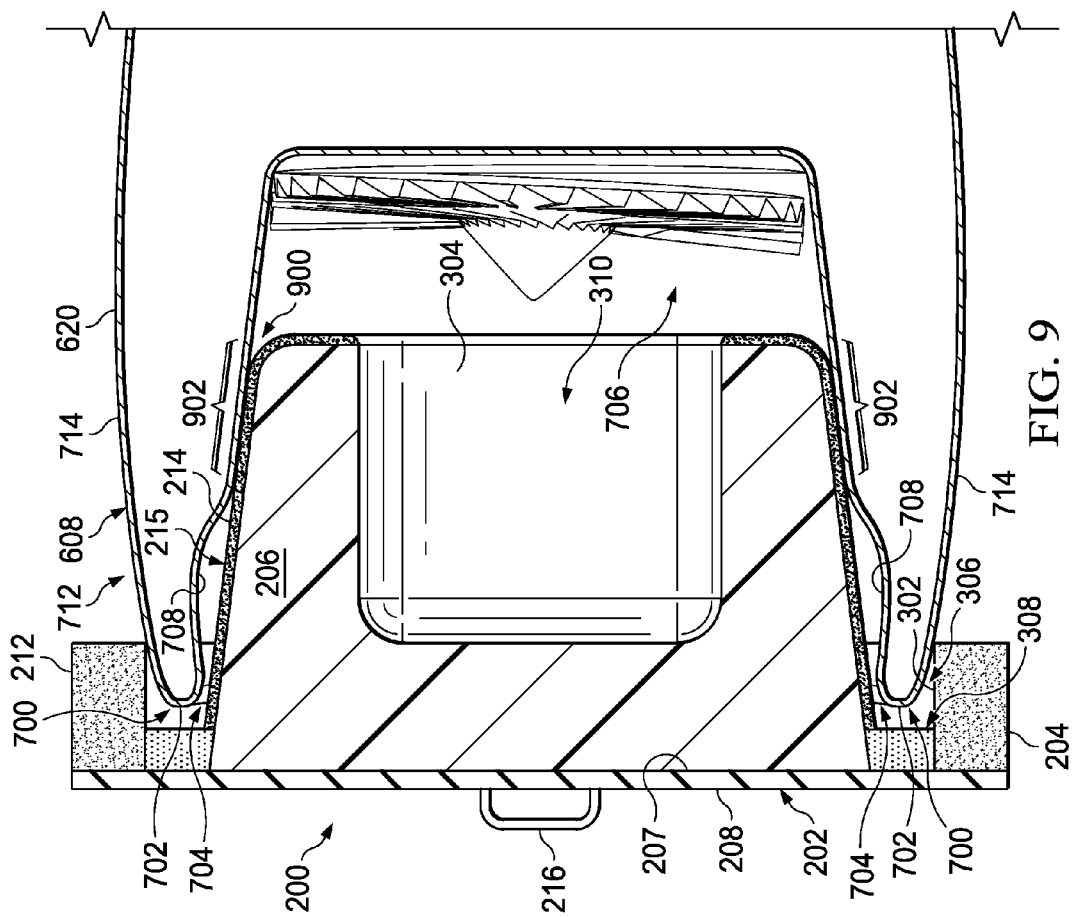
FIG. 9 is an illustration of a cross-sectional view of a cover attached to an engine in accordance with an illustrative embodiment.

With reference now to FIG. 9, an illustration of a cross-sectional view of cover 200 attached to engine 608 is depicted in accordance with an illustrative embodiment. As depicted, cover 200 has been attached to end 700 of housing 620 to form interference fit 900. Interference fit 900 is formed by portion 902 of interior surface 708 of housing 620 and outer layer of material 215 at outer surface 214 of retaining feature 206.

In this illustrative example, leading edge 702 at end 700 may not come into contact with base 308 of channel 306 when interference fit 900 is formed. Further, as depicted, exterior surface 714 of housing 620 may not come into contact with inner surface 302 of flange 204 when interference fit 900 is formed.

The illustrations of cover 200 in FIGS. 2-9 are not meant to imply physical or architectural limitations to the manner in which an illustrative embodiment may be implemented. Other components in addition to or in place of the ones illustrated may be used. Some components may be unnecessary.

For example, in some illustrative examples, a portion of inner surface 302 may come into contact with exterior surface 714 of housing 620 when interference fit 900 is formed. In other illustrative examples, leading edge 702 may come into contact with base 308 of channel 306 when interference fit 900 is formed.

Further, the different components shown in FIGS. 2-9 may be combined with components in FIG. 1, used with components in FIG. 1, or a combination of the two. Additionally, some of the components in FIGS. 2-9 may be illustrative examples of how components shown in block form in FIG. 1 can be implemented as physical structures. Of course, in other illustrative examples, the components shown in block from in FIG. 1 may be implemented using other physical structures than the physical structures shown in FIGS. 2-9.

Figure 10:
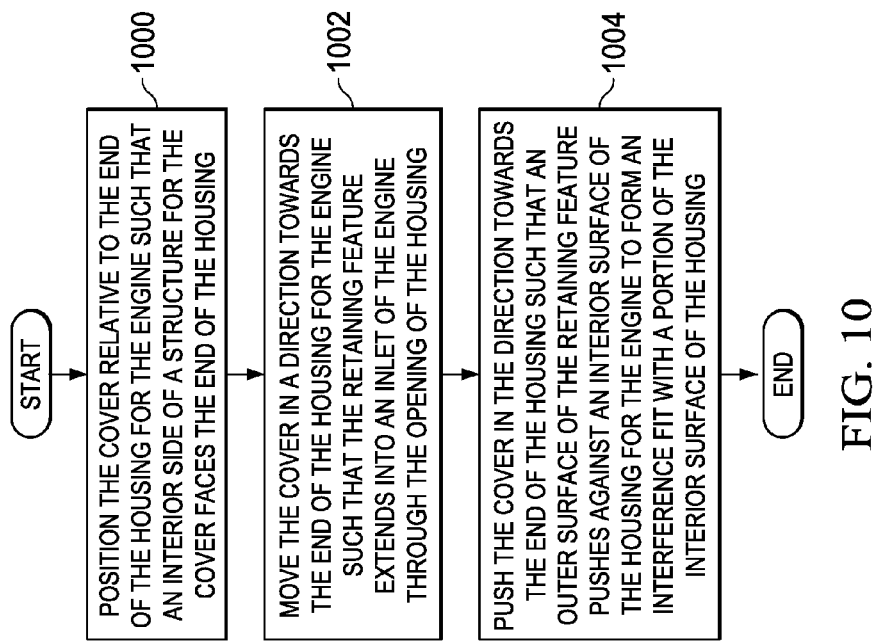
FIG. 10 is an illustration of a process for covering an end of a housing for an engine in the form of a flowchart in accordance with an illustrative embodiment.

With reference now to FIG. 10, an illustration of a process for covering an end of a housing for an engine in the form of a flowchart is depicted in accordance with an illustrative embodiment. The process depicted in FIG. 10 may be used to attach a cover, such as cover 100 in FIG. 1, to the end of a housing for an engine, such as end 116 of housing 108 for engine 102 in FIG. 1.

The process begins by positioning the cover relative to the end of the housing for the engine such that an interior side of a structure for the cover faces the end of the housing (operation 1000). The cover may comprise the structure as well as a flange and a retaining feature. In operation 1000, the cover may be positioned such that the flange and the retaining feature extend from the interior side of the structure in a direction towards the end of the housing for the engine.

Thereafter, the cover is moved in a direction towards the end of the housing for the engine such that the retaining feature extends into an inlet of the engine through the opening of the housing (operation 1002). The cover is then pushed in the direction towards the end of the housing such that an outer surface of the retaining feature pushes against an interior surface of the housing for the engine to form an interference fit with a portion of the interior surface of the housing (operation 1004), with the process terminating thereafter.

In operation 1004, the retaining feature is moved into the inlet until an interference fit is formed with a desired level of stiction. The cover is considered attached to the end of the housing when the interference fit has been formed with the desired level of stiction.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11. Aircraft 1200 may be an example of one manner in which aircraft 106 in FIG. 1 may be implemented.

Aircraft 1200 may include airframe 1202 with plurality of systems 1204 and interior 1206. Examples of systems 1204 include one or more of propulsion system 1208, electrical system 1210, hydraulic system 1212, and environmental system 1214.

Any number of other systems may be included. Although an aerospace example is shown, different illustrative embodiments may be applied to other industries, such as the automotive industry, the marine industry, the energy industry, the construction industry, or some other suitable type of industry.

Apparatuses and methods embodied herein may be employed during at least one of the stages of aircraft manufacturing and service method 1100 in FIG. 11. For example, without limitation, cover 100 in FIG. 1 may be used to cover a jet engine for aircraft 1200 during at least one of component and subassembly manufacturing 1106, system integration 1108, and maintenance and service 1114.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11.

One or more apparatus embodiments, method embodiments, or a combination thereof may be utilized while aircraft 1200 is in service 1112 and/or during maintenance and service 1114 in FIG. 11. Use of the different illustrative embodiments may protect an inlet for an engine in aircraft 1200 from, for example, without limitation, debris, foreign objects, weather conditions, birds nesting within the inlet, and/or other types of situations. Further, the different illustrative embodiments provide a cover that can cover and protect the leading edge of the housing for the engine in aircraft 1200.

Thus, the different illustrative embodiments provide a method and apparatus for protecting an inlet of an aircraft engine and a leading edge of a cowl structure for the aircraft engine. In one illustrative embodiment, an apparatus comprises a structure, a flange, and a retaining feature. The structure is configured to cover an opening of a housing for an engine. The flange is comprised of a deformable material and is configured to extend from the structure around a circumference of the structure. The retaining feature is configured to extend from a middle portion of the structure such that the retaining feature and the flange form a channel configured to receive an end of the housing. The retaining feature is configured to extend into an inlet of the engine through the opening of the housing to form an interference fit with a portion of an interior surface of the housing.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a structure configured to cover an opening of a housing for an engine;
   a static flange comprised of a deformable material and configured to extend from the structure around a circumference of the structure; and
   a retaining feature configured to: extend, substantially as a hollowed cylinder into an inlet of the engine through the opening of the housing, from a middle portion of the structure, the hollowed cylinder being sealed at one end by the structure, such that the retaining feature and the flange form a channel configured to receive an end of the housing; and form an interference fit with a portion of an interior surface of the housing.

2. The apparatus of claim 1, wherein the flange has a thickness selected to absorb at least a portion of kinetic energy applied to the flange to reduce a possibility of a number of inconsistencies forming at the end of the housing in response to the kinetic energy being applied to the flange.

3. The apparatus of claim 1, wherein the structure has a shape selected to fully cover the opening of the housing for the engine.

4. The apparatus of claim 1, wherein an exterior surface of the housing does not contact an inner surface of the flange and an edge of a cowl structure of the housing does not contact a base of the channel when the interference fit is formed.

5. The apparatus of claim 1, wherein the flange comprises:
   an inner surface in which the inner surface of the flange forms a portion of the channel; and
   an outer surface.

6. The apparatus of claim 1, wherein the flange is configured to extend over a portion of an exterior surface of the housing when the interference fit is formed.

7. The apparatus of claim 1 further comprising:
   a number of handles attached to an exterior side of the structure.

8. The apparatus of claim 1, wherein the deformable material is a foam material.

9. The apparatus of claim 1, wherein the deformable material is selected from one of a foam material, a polyurethane material, an elastomer, a polymer, a shape memory polymer, a syntactic foam material, an integral skin foam material, and an aerogel.

10. The apparatus of claim 1, wherein the engine is a jet engine for an aircraft.

11. The apparatus of claim 1, wherein the structure comprises:
   an interior side in which the flange and the retaining feature are configured to extend from the structure at the interior side of the structure; and
   an exterior side.

12. The apparatus of claim 11, wherein the exterior side of the structure is substantially planar.

13. The apparatus of claim 1, wherein the retaining feature comprises:
   an outer surface, wherein the outer surface forms a portion of the channel; and
   an inner surface.

14. The apparatus of claim 13, wherein the inner surface of the retaining feature forms a hollow portion in the retaining feature.

15. The apparatus of claim 13, wherein the retaining feature further comprises:
   an outer layer of material on the outer surface of the retaining feature, wherein the outer layer of material comprises another deformable material.

16. A method for covering an end of a housing for an engine, the method comprising:
   positioning a cover relative to the end of the housing for the engine, such that the cover comprises: a structure; a static flange comprised of a deformable material extending from the structure around a circumference of the structure; and a retaining feature extending substantially as a hollowed cylinder, from a middle portion of the structure, the structure sealing an end of the hollowed cylinder, the retaining feature and the flange forming a channel;
   moving the cover in a direction towards the end of the housing for the engine such that the retaining feature extends into an inlet of the engine through an opening of the housing;
   forming an interference fit between the retaining feature and a portion of an interior surface of the housing; and
   receiving the end of the housing into the channel.

17. The method of claim 16, wherein the step of positioning the cover relative to the end of the housing for the engine comprises:
   positioning the cover relative to the end of the housing for the engine such that an interior side of the structure faces the end of the housing.

18. The method of claim 16, wherein the step of moving the cover in the direction towards the end of the housing for the engine such that the retaining feature extends into the inlet of the engine through the opening of the housing to form the interference fit between the retaining feature and the portion of the interior surface of the housing comprises:
   moving the cover in the direction towards the end of the housing such that the retaining feature extends into the inlet of the engine through the opening of the housing; and
   pushing the cover in the direction towards the end of the housing such that an outer surface of the retaining feature pushes against the interior surface of the housing to form the interference fit with the portion of the interior surface of the housing.

19. The method of claim 18, wherein the step of pushing the cover in the direction towards the end of the housing such that the outer surface of the retaining feature pushes against the interior surface of the housing to form the interference fit with the portion of the interior surface of the housing comprises:
   pushing the cover in the direction towards the end of the housing such that the outer surface of the retaining feature pushes against the interior surface of the housing to form the interference fit with a desired level of stiction between the outer surface of the retaining feature and the portion of the interior surface of the housing.

20. A cover for an inlet of a jet engine, the cover comprising:
   a structure configured to cover an opening into the inlet of the jet engine in which the opening is defined by a leading edge of a cowl structure for the jet engine, wherein the structure has an interior side and an exterior side in which the exterior side is substantially planar;

a static flange comprised of a deformable material and configured to extend from the structure around a circumference of the structure at the interior side of the structure; and a retaining feature configured to: extend, substantially as a hollowed cylinder into the inlet through the opening, from a middle portion of the structure at the interior side of the structure, the hollowed cylinder being sealed at one end by the structure, such that the retaining feature and the flange form a channel configured to receive the leading edge of the cowl structure for the jet engine; and form an interference fit with a portion of an interior surface of the cowl structure for the jet engine.

* * * * *